United States Patent
Hu et al.

(10) Patent No.: US 11,974,251 B2
(45) Date of Patent: Apr. 30, 2024

(54) METHOD FOR DETERMINING PAGING CYCLE, AND TERMINAL DEVICE

(71) Applicant: GUANGDONG OPPO MOBILE TELECOMMUNICATIONS CORP., LTD., Guangdong (CN)

(72) Inventors: Yi Hu, Guangdong (CN); Haitao Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/331,464

(22) Filed: Jun. 8, 2023

(65) Prior Publication Data

US 2023/0319784 A1    Oct. 5, 2023

Related U.S. Application Data

(63) Continuation of application No. PCT/CN2020/139623, filed on Dec. 25, 2020.

(51) Int. Cl.
  H04W 68/02    (2009.01)
  H04W 76/28    (2018.01)

(52) U.S. Cl.
  CPC .......... H04W 68/02 (2013.01); H04W 76/28 (2018.02)

(58) Field of Classification Search
  CPC .............................. H04W 68/02; H04W 76/28
  USPC ......................................................... 455/458
  See application file for complete search history.

(56) References Cited

U.S. PATENT DOCUMENTS

| | | | |
|---|---|---|---|
| 2012/0281580 A1* | 11/2012 | Lee | H04W 74/004 370/252 |
| 2018/0192436 A1 | 7/2018 | Yi et al. | |
| 2020/0229095 A1* | 7/2020 | Shrestha | H04W 52/0235 |
| 2020/0359196 A1* | 11/2020 | Balasubramaniam | H04W 72/30 |
| 2023/0247656 A1 | 8/2023 | Sha | |

FOREIGN PATENT DOCUMENTS

| | | |
|---|---|---|
| CN | 109041269 A | 12/2018 |
| CN | 111246503 A | 6/2020 |
| WO | 2022077315 A1 | 4/2022 |

OTHER PUBLICATIONS

3GPP TSG-RAN WG2 Meeting #112 electronic R2-2009364 Online, Nov. 2"¢-13", 2020 Source: CATT Title: Summary of email discussion 915—UE power saving features (Year: 2020).*
CATT. "Summary of email discussion 915-UE power saving features" 3GPP TSG-RAN WG2 Meeting #112 electronic R2-2009364, Nov. 13, 2020. (27 pages).
Xiaomi Communications. "Discussion e-DRX for Redcap Devices" 3GPP TSG-RAN WG2 Meeting #112 electronic R2-2008948, Nov. 13, 2020. (3 pages).

(Continued)

Primary Examiner — Inder P Mehra
(74) Attorney, Agent, or Firm — PERKINS COIE LLP

(57) ABSTRACT

A method for determining a paging cycle is provided. For a terminal device in a radio resource control inactive (RRC_INACTIVE) state, in response to that the terminal device does not use at least one of a paging time window (PTW) or a paging hyperframe (PH) for monitoring paging under a configuration of a first cycle parameter, the terminal device determines a cycle of monitoring paging according to the first cycle parameter. The first cycle parameter comprises at least one of a core network (CN) extended discontinuous reception (eDRX) cycle, a radio access network (RAN) eDRX cycle, a CN discontinuous reception (DRX) cycle, an RAN DRX cycle or a cell default paging cycle (defaultPagingCycle) indicated by a system message.

17 Claims, 8 Drawing Sheets

(56) References Cited

OTHER PUBLICATIONS

International Search Report in the international application No. PCT/CN2020/139623, dated Sep. 27, 2021. (7 pages).
English translation of the Written Opinion of the International Search Authority in the international application No. PCT/CN2020/139623, dated Sep. 27, 2021. (6 pages).
Ericsson, "New SID on support of reduced capability NR devices", 3GPP TSG RAN Meeting #86, RP-193238, Dec. 9-12, 2019. (5 pages).
Vice Chairman (ZTE Corporation), "Report from Break-out session on R16 eMIMO, CLI, PRN, RACS and R17 NTN and REDCAP", 3GPP TSG-RAN WG2 Meeting #111 electronic R2-2008122, Aug. 17-28, 2020. (45 pages).
Vice Chairman (ZTE Corporation), "Report from Break-out session on R16 eMIMO, CLI, PRN, RACS and R17 NTN and REDCAP", 3GPP TSG-RAN WG2 Meeting #112 electronic R2-2010702, Nov. 2-13, 2020. (50 pages).
3rd Generation Partnership Project;Technical Specification Group Radio Access Network;"NR;User Equipment (UE) procedures in Idle mode and RRC Inactive state(Release 16)", 3GPP TS 38.304 V16.2.0 (Sep. 2020). (37 pages).
Huawei et al: "Discussion on paging of RRC_Inactive for eMTC connected to 5GC", 3GPP Draft; R2-2000645, 3RD Generation Partnership Project (3GPP), Mobile Competence Centre; 650, Route Des Lucioles; F-06921 Sophia-Antipolis Cedex; France, vol. Ran WG2, No. Electronic meeting; Feb. 24, 2020-Mar. 6, 2020, Feb. 14, 2020 (Feb. 14, 2020), XP052355816, the whole document. 6 pages.
Supplementary European Search Report in the European application No. 20966636.1, mailed on Dec. 5, 2023. 9 pages.

* cited by examiner

METHOD FOR DETERMINING PAGING CYCLE, AND TERMINAL DEVICE

CROSS-REFERENCE TO RELATED APPLICATION

This application is a continuation of International Patent Application No. PCT/CN2020/139623 filed on Dec. 25, 2020, the disclosure of which is hereby incorporated by reference in its entirety.

BACKGROUND

In a long term evolution (LTE) system, for user equipment (UE) in a radio resource control inactive (RRC_INACTIVE) state, if an extended discontinuous reception (eDRX) is configured for the UE by a higher layer, the current standard defines a behavior of UE monitoring paging during a paging time window (PTW) and a behavior of UE monitoring paging outside the PTW. However, in values of an eDRX cycle supported by LTE, when the eDRX cycle is greater than or equal to 10.24 s, paging monitoring does not use the PTW, and when the eDRX cycle is equal to 5.12 s, paging monitoring uses the PTW. When the eDRX cycle is configured as 5.12 s, the behavior of UE monitoring paging in an RRC_IDLE state is clear, but the behavior of UE monitoring paging in the RRC_INACTIVE state is not clear, for example, how UE determines the DRX cycle T of monitoring paging in the RRC_INACTIVE state.

SUMMARY

The present disclosure relates to the communication field, and in particular, to a method for determining a paging cycle, a terminal device and a computer-readable storage medium.

In a first aspect of the embodiments of the present disclosure, there is provided a method for determining a paging cycle, including that: for a terminal device in an RRC_INACTIVE state, in response to that the terminal device does not use at least one of a PTW or a PH for monitoring paging under a configuration of a first cycle parameter, the terminal device determines a cycle of monitoring paging according to the first cycle parameter.

The first cycle parameter includes at least one of a core network (CN) extended discontinuous reception (eDRX) cycle, a radio access network (RAN) eDRX cycle, a CN discontinuous reception (DRX) cycle, an RAN DRX cycle or a cell default paging cycle (defaultPagingCycle) indicated by a system message.

In another aspect of the embodiments of the present disclosure, there is provided a terminal device, which includes a memory storing executable program codes; and a processor and a transceiver that are coupled to the memory; the processor and the transceiver are configured to implement the method in the first aspect of the embodiments of the present disclosure.

In another aspect of the embodiments of the present disclosure, there is provided a network device, which includes a processor, configured to configure a first cycle parameter to a terminal device in a radio resource control inactive (RRC_INACTIVE) state. The first cycle parameter includes at least one of a core network (CN) extended discontinuous reception (eDRX) cycle, a radio access network (RAN) eDRX cycle, a CN discontinuous reception (DRX) cycle, an RAN DRX cycle or a cell default paging cycle (defaultPagingCycle) indicated by a system message.

DETAILED DESCRIPTION

Figure 1:
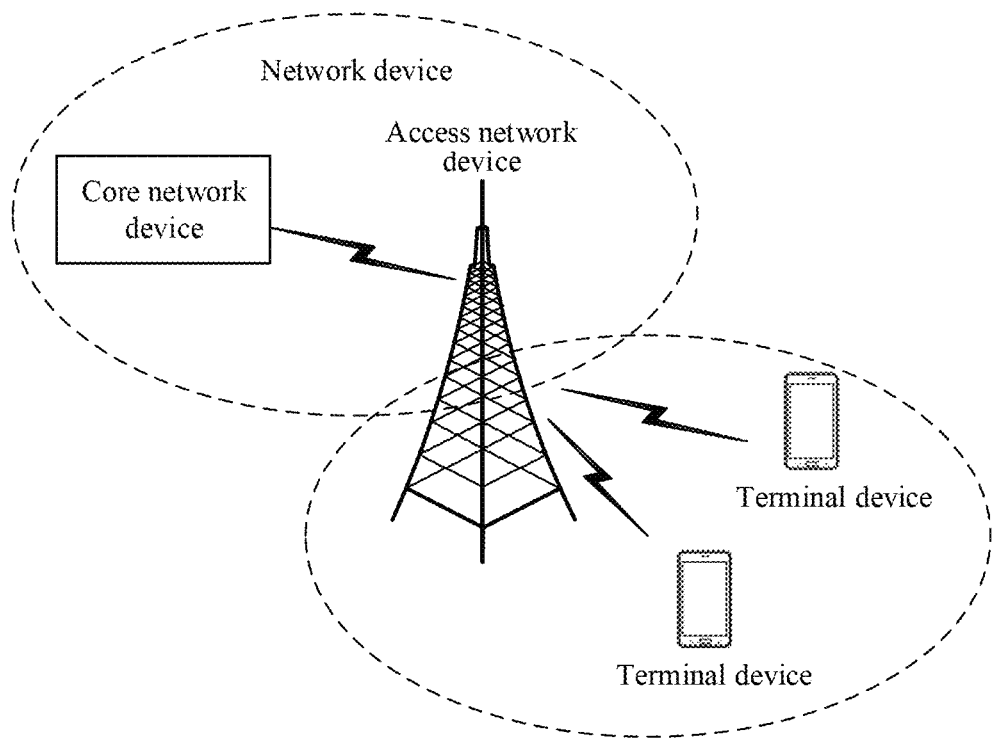
FIG. 1 is a system architecture diagram of a communication system used in embodiments of the present disclosure.

The technical solution in the embodiments of the present disclosure will be described below in conjunction with the drawings in the embodiments of the present disclosure, and it will be apparent that the described embodiments are only part of the embodiments of the present disclosure, but not all of them. Based on the embodiments in the present disclosure, all other embodiments obtained by those of ordinary skill in the art without creative work fall within the scope of protection of the present disclosure.

The following is a brief description of the terms referred to in embodiments of the present disclosure:

1. Radio Resource Control (RRC) State of User Equipment (UE)

In an LTE system and a 5G system, there are three protocol states of RRC, namely RRC idle (RRC_IDLE) state, RRC inactive (RRC_INACTIVE) state and RRC connected (RRC_CONNECTED) state.

RRC_IDLE: in this state, mobility is cell selection and cell reselection based on UE, paging is initiated by a core network (CN), and paging areas are configured by CN. There is no UE access stratum (AS) context on the base station side. There is no RRC connection.

RRC_INACTIVE: in this state, mobility is cell selection and cell reselection based on the UE, connection exists between CN and (new radio) NR, and UE AS context exists on a certain base station. Paging is triggered by RAN, RAN-based paging areas are managed by the RAN, and network side knows that the location of the UE is at an RAN-based paging area level.

RRC CONNECTED: in this state, RRC connection exists, and UE AS context exists on base station side and UE side. The network side knows that the location of the UE is at a cell-specific level. Mobility is the mobility controlled by the network side. Data may be transmitted between the UE and the base station.

2. 5G NR Paging Mechanism

The main function of paging is to enable a network to page UE through a paging message in the RRC_IDLE state or RRC_INACTIVE state of the UE, or notify the UE of a system message change or earthquake and tsunami/public warning information through a short message (which is applicable to all RRC states of the UE, including the connected state).

Paging includes a physical downlink control channel (PDCCH) scrambled by a paging radio network temporary identifier (P-RNTI) and a physical downlink share channel (PDSCH) scheduled by the PDCCH. The paging message is transmitted in PDSCH and the short message is 8 bits and transmitted in PDCCH.

For UEs in the RRC_IDLE state or the RRC_INACTIVE state, because there is no other data communication between the UEs and the network, in order for power saving of the terminals, the UEs may discontinuously monitor paging channel, that is, adopting a paging discontinuous reception (DRX) mechanism. Under the paging DRX mechanism, the UE only needs to monitor paging during one paging occasion (PO) in each DRX cycle. The PO is a series of PDCCH monitoring occasions and it may be composed of multiple slots. In addition, there is also introduced a concept of paging frame (PF), and the PF refers to a wireless frame (fixed 10 ms), which may contain multiple POs or be starting positions of multiple POs.

A cycle of the paging DRX is jointly determined by a common cycle in the system broadcast and a specific cycle configured in a high-level signaling (non-access stratum (NAS) signaling), and the UE takes a minimum cycle of the two as the paging cycle. From the perspective of network, one paging DRX cycle may have multiple POs, and the position where the UE monitors PO is related to an identity (ID) of the UE. The PF and PO of a certain UE in a paging DRX are determined as follows (TS 38.304):

System frame number (SFN) of the PF is determined by the following formula:

$$(SFN+PF\_offset) \bmod T = (T \text{ div } N)*(UE\_ID \bmod N)$$

Index (i_s) of the PO within a PF is determined by the following formula:

$$i\_s = \text{floor}(UE\_ID/N) \bmod Ns$$

Some of the above parameters are explained as follows:
T: DRX cycle of receiving paging by UE. The network will broadcast a default DRX cycle. If a UE-specific DRX cycle is configured for the UE by RRC/higher layer, the shortest one of the DRX cycle broadcast by the network and the UE-specific DRX cycle configured by the RRC/higher layer is taken as the DRX cycle of the UE. If the UE-specific DRX cycle is not configured for the UE through RRC or by higher layer, the DRX cycle broadcast by the network is taken as the DRX cycle of the UE.

N: the number of PFs contained in a DRX cycle;
Ns: the number of POs contained in a PF;
PF_offset: used to determine a time domain offset of PF;
UE_ID: 5G-S-TMSI mod 1024.

The above parameters are configured as follows:

```
PCCH-Config ::=     SEQUENCE {
   defaultPagingCycle      PagingCycle,
   nAndPagingFrameOffset   CHOICE {
      oneT          NULL,
      halfT         INTEGER (0..1),
      quarterT      INTEGER (0..3),
      oneEighthT    INTEGER (0..7),
      oneSixteenthT INTEGER (0..15)
   },
   ns                ENUMERATED {four, two, one},
   firstPDCCH-MonitoringOccasionOfPO   CHOICE {
      sCS15KHZoneT                                     SEQUENCE (SIZE (1..maxPO-perPF)) OF INTEGER (0..139),
      sCS30KHZoneT-SCS15KHZhalfT                       SEQUENCE (SIZE (1..maxPO-perPF)) OF INTEGER (0..279),
      sCS60KHZoneT-SCS30KHZhalfT-SCS15KHZquarterT      SEQUENCE (SIZE (1..maxPO-perPF)) OF INTEGER (0..559),
      sCS120KHZoneT-SCS60KHZhalfT-SCS30KHZquarterT-SCS15KHZoneEighthT      SEQUENCE (SIZE (1..maxPO-perPF)) OF INTEGER (0..1119),
      sCS120KHZhalfT-SCS60KHZquarterT-SCS30KHZoneEighthT-SCS15KHZoneSixteenthT   SEQUENCE (SIZE (1..maxPO-perPF)) OF INTEGER (0..2239),
      sCS120KHZquarterT-SCS60KHZoneEighthT-SCS30KHZoneSixteenthT           SEQUENCE (SIZE (1..maxPO-perPF)) OF INTEGER (0..4479),
      sCS120KHZoneEighthT-SCS60KHZoneSixteenthT        SEQUENCE (SIZE (1..maxPO-perPF)) OF INTEGER (0..8959),
      sCS120KHZoneSixteenthT                           SEQUENCE (SIZE (1..maxPO-perPF)) OF INTEGER (0..17919)
   } OPTIONAL,     -- Need R
   ...,
   [[
      nrofPDCCH-MonitoringOccasionPerSSB-InPO-r16      INTEGER (2..4) OPTIONAL -- Cond SharedSpectrum2
   ]]
}
```

For one UE, the position of PF and the indexes of POs in a paging DRX cycle may be known according to the above formulae. TS 38.304 specifies that a PO is composed of multiple PDCCH monitoring occasions, and a PO contains X PDCCH monitoring occasions, and X is equal to the number of actual sent of synchronization signal block (SSB) broadcast in a master information block (MIB).

After the UE knows PF, the indexes of POs and the number of PDCCH monitoring occasions in a PO, the UE only needs to know a starting position of the first PDCCH monitoring occasion of the PO through related configuration parameters, and the starting position may be configured by high-level signaling or obtained based on the index of PO. The UE performs blind detection on a paging message according to the determined PO.

3. Long Term Evolution (LTE) Paging Mechanism

In the LTE system, the paging DRX mechanism is also adopted for the UE in the RRC_IDLE state or the RRC_INACTIVE state. Like NR system, under the paging DRX mechanism, the UE only needs to monitor paging during a PO in each DRX cycle. Concepts of PF and PO are also defined in the LTE system. Different from NR system, in LTE system, PO is a subframe in a PF corresponding to the PO.

Like the NR system, in the LTE system, for UE in the RRC_IDLE state or the RRC_INACTIVE state, the UE calculates its own PO according to parameters such as the UE ID, T, etc. T denotes the DRX cycle of receiving paging by UE, and it may be determined as follows.

For UE in the RRC_IDLE state, if an extended DRX (eDRX) is configured for the UE by higher layer and the configured eDRX cycle is 5.12 s, the value of T is 5.12 s. Otherwise, if a UE-specific DRX cycle is configured for the UE by the higher layer, the minimum of the DRX cycle broadcast by the network and the UE-specific DRX cycle configured by the higher layer is taken as T. If the UE-specific DRX cycle is not configured for the UE by the higher layer, the DRX cycle broadcast by the network is taken as T.

For UE in the RRC_INACTIVE state, if an eDRX is not configured for the UE by higher layer, the minimum of the DRX cycle broadcast by the network and the UE-specific DRX cycle configured by the RRC/higher layer is taken as T. Otherwise, if the eDRX is configured for the UE by the higher layer, the minimum of the DRX cycle broadcast by the network and the UE-specific DRX cycle configured by the RRC/higher layer is taken as T during the PTW. In addition to PTW, the UE-specific DRX cycle configured by the RRC is taken as T.

4. LTE eDRX Mechanism

Considering terminals such as narrow band internet of things (NB-IoT) and enhanced machine type communication (eMTC) have single service types and very low traffic activity, these terminals are in disconnected state most of the time, and considering that services of these terminals are insensitive to the delay requirements, in order to further save power for the terminals in the disconnected state, an eDRX mechanism is introduced for these terminals in LTE, which may support larger paging cycle, that is, the paging cycle is greater than 256 SFNs. In LTE, the lowest value of eDRX cycle configured by the higher layer is 5.12 s.

For UE configured with eDRX, if the eDRX cycle of the UE is 5.12 s, the UE calculates its own corresponding PO based on T=5.12 s. If the eDRX cycle of the UE is greater than or equal to one hyper system frame number (H-SFN), the UE monitors the PDCCH scrambled by P-RNTI on its own PO within a paging time window (PTW) in one eDRX cycle. The PTW is UE-specific and is determined according to a paging hyperframe (PH), a start time point PTW_start and an end time point PTW_end located within the PH.

PH is H-SFN that satisfies the following conditions:
H-SFN mod TeDRX, H=(UE_ID_H mod TeDRX,H)

Wherein UE_ID_H is obtained based on a hashed ID, and TeDRX,H is eDRX cycle in unit of hyperframe and is configured by access and mobility management function (AMF).

PTW_start is a start radio frame number of PTW, and the PTW_start is SFN that satisfies the following conditions:

SFN=256*ieDRX ieDRX=floor(UE_ID_*H*/TeDRX,*H*)mod 4

PTW_end is an end radio frame number of PTW, and the PTW_end is SFN that satisfies the following conditions:

SFN=(PTW_start+*L*\*100−1)mod 1024

Wherein L is a window length of PTW, and L is configured by AMF.

5. NR Reduced Capacity (RedCap) eDRX Mechanism

In the work project of R17 NR, the 3GPP RAN plenary session agreed to study the RedCap NR terminal project (RP-193238). One of the objectives of the project is:

Study UE power saving and battery lifetime enhancement for reduced capability UEs in applicable use cases (e.g. delay tolerant) [RAN2, RAN1]:

Reduced PDCCH monitoring by smaller numbers of blind decodes and CCE limits [RAN1].

Extended DRX for RRC Inactive and/or Idle [RAN2]

RRM relaxation for stationary devices [RAN2]

That is to say, for RedCap NR terminals, eDRX mechanism is introduced in idle state or inactive state to save power and prolong battery life.

At present, NR RedCap is in the SI stage, and the last two RAN2 conferences (RAN2 #111e and RAN2 #112e) have reached the following conclusions on the RedCap eDRX mechanism:

For RRC_IDLE state, DRX cycle is extended beyond 2621.44 s as a baseline, and it may be studied whether to support a larger eDRX cycle (for example, 10485.76 s). For the RRC_INACTIVE state, the DRX cycle is extended up to 10.24 s as the baseline, and it may be discussed at next conference whether to support a larger DRX cycle.

RAN2 will study whether the eDRX cycle for the RRC_IDLE state and the RRC_INACTIVE state supports values less than 5.12 s.

For the UE in the RRC_IDLE state and the RRC_INACTIVE state, if the maximum DRX cycle supported exceeds 10.24 s, an eDRX mechanism with eDRX cycle exceeding 10.24 s in LTE (i.e., using PTW, PH, etc.) is taken as the baseline. For UE in RRC_IDLE state and RRC_INACTIVE state, if eDRX cycle is less than 10.24 s, PTW, PH and the like are not used for paging monitoring.

For UE in RRC_IDLE state and RRC_INACTIVE state, if the eDRX cycle is equal to 10.24 s, it is basically assumed that PTW and PH are not used, but other schemes are not excluded.

On the one hand, in the LTE system, for UE in the RRC_INACTIVE state, if an eDRX is configured for the UE by a higher layer, the current standard defines the behavior of UE monitoring paging during the PTW and the behavior of UE monitoring paging outside the PTW. However, in values of an eDRX cycle value supported by LTE, when the eDRX cycle is greater than or equal to 10.24 s, the PTW is used for paging monitoring, and when the eDRX cycle is equal to 5.12 s, the PTW is not used for paging monitoring. When the eDRX cycle is configured as 5.12 s, the behavior of UE monitoring paging in the RRC_IDLE state is clear, but the behavior of UE monitoring paging in the RRC_INACTIVE state is not clear, for example, how the UE should determine the DRX cycle T of monitoring paging in the RRC_INACTIVE state.

On the other hand, in the NR system, based on the conclusions of RAN2 conference for SI stage of RedCap at present, for RedCap UE in RRC_INACTIVE state, firstly, whether DRX cycle greater than 10.24 s are supported in the RRC_INACTIVE state is still inconclusive. In other words, in order to expand the RAN DRX cycle configured by the network, it is inconclusive whether to directly expand the range of current parameter ran-PagingCycle or introduce a new parameter RAN eDRX cycle to correspond to the extended DRX cycle configuration.

In addition, like the UE in the LTE system, if the eDRX cycle configured by the higher layer and the DRX cycle/eDRX cycle configured by RRC (if the RAN eDRX cycle configuration parameter is introduced) are both less than (or equal to) 10.24 s, that is, the PTW is not used for paging monitoring, then how the UE determines the DRX cycle T of monitoring paging is also a problem to be solved.

The technical solution of the embodiments of the present disclosure may be applied to various communication systems. For example, global system of mobile communication (GSM) system, code division multiple access (CDMA) system, wideband code division multiple access (WCDMA) system, general packet radio service (GPRS), long term evolution (LTE) system, advanced long term evolution (LTE-A) system, new radio (NR) system, evolution system of NR system, LTE-based access to unlicensed spectrum (LTE-U) system, NR-based access to unlicensed spectrum (NR-U) system, non-terrestrial networks (NTN) system, universal mobile telecommunication system (UMTS), wireless local area network (WLAN), wireless fidelity (WiFi), 5th-generation communication system or other communication systems.

Generally speaking, conventional communication systems support a limited number of connections and are easy to implement. However, with the development of communication technology, mobile communication systems will not only support conventional communication, but also support, for example, device to device (D2D) communication, machine to machine (M2M) communication, machine type communication (MTC), vehicle to vehicle (V2V) communication, vehicle to everything (V2X), etc. Embodiments of the present disclosure may also be applied to these communication systems.

Optionally, the communication system in the embodiments of the present disclosure may be applied to a carrier aggregation (CA) scenario, a dual connectivity (DC) scenario, and a standalone (SA) network distribution scenario.

Optionally, the communication system in the embodiments of the present disclosure may be applied to unlicensed spectrum, wherein the unlicensed spectrum may also be considered shared spectrum. Optionally, the communication system in the embodiments of the present disclosure may also be applied to licensed spectrum, wherein the licensed spectrum may also be considered as non-shared spectrum.

Embodiments of the present disclosure are described in connection with a network device and a terminal device. The terminal device may be referred to as user equipment (UE), an access terminal, a subscriber unit, a subscriber station, a mobile station, a mobile platform, a remote station, a remote terminal, a mobile device, a user terminal, a terminal, a wireless communication device, a user agent, or a user device.

The terminal device may be a station (ST) in the WLAN, or it may be a cellular phone, a cordless phone, a session initiation protocol (SIP) telephone, wireless local loop (WLL) station, a personal digital assistant (PDA) device, a handheld device with wireless communication function, a computing device or other processing device connected to wireless modem, an in-vehicle device, a wearable device, a next-generation communication system such as a terminal device in an NR network, or the terminal device in the future evolved public land mobile network (PLMN) network, etc.

In embodiments of the present disclosure, the terminal device may be deployed on land, including indoor or outdoor, hand-held, wearable or in-vehicle. The terminal device may also be deployed on the water (such as ships, etc.). The terminal device may also be deployed on airplanes, balloons and satellites, etc.

In the embodiments of the present disclosure, the terminal device may be a mobile phone, a pad, a computer with wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city or smart home, etc.

By way of example and not limitation, in the embodiments of the present disclosure, the terminal device may also be a wearable device. A wearable device may also be called wearable intelligent device, which is the general name of wearable devices developed by applying wearable technology to intelligently design daily wear, such as glasses, gloves, watches, clothing and shoes. The wearable device is a portable device that is worn directly on the body or integrated into the user's clothes or accessories. The wearable device is not only a kind of hardware device, but also realizes powerful functions through software support, data interaction and cloud interaction. Generalized wearable smart devices include full functions and large size, which may realize complete or partial functions without relying on smart phones, such as smart watches or smart glasses, and only focus on certain application functions, and the wearable smart devices need to be used in conjunction with other devices such as smart phones, such as various smart bracelets and smart jewelry for monitoring physical signs.

In embodiments of the present disclosure, the network device may be a device for communicating with a mobile device, and the network device may be an access point (AP) in WLAN, a base transceiver station (BTS) in GSM or CDMA, a base station (NodeB, NB) in WCDMA, an evolutional node B (eNB or eNodeB) in LTE, a relay station or an access point, or an in-vehicle device, a wearable device, a network device in NR network (gNB), a network device in future evolved PLMN network or a network device in NTN network, etc.

By way of example and not limitation, in embodiments of the present disclosure, the network device may have mobility characteristics, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, and the like. Optionally, the network device may also be a base station arranged on land, water and the like.

In the embodiments of the present disclosure, the network device may provide services for a cell, the terminal device communicates with the network device through transmission resources (e.g. frequency domain resources, or spectrum resources) used by the cell, the cell may be a cell corresponding to a network device (e.g. a base station), the cell may belong to a macro base station or a base station corresponding to a small cell. The small cell may include metro cell, micro cell, pico cell, femto cell, etc. These small cells have the characteristics of small coverage and low transmission power, and are suitable for providing high-speed data transmission services.

FIG. 1 is a system architecture diagram of a communication system used in the embodiments of the present disclosure. The communication system may include a network device, which may be a device that communicates with a terminal device (or referred to as a communication terminal or terminal). The network device may provide communication coverage for a particular geographic area and may communicate with terminal devices located within the coverage area. FIG. 1 exemplarily illustrates a network device and two terminal devices. Optionally, the communication system may include multiple network devices and other numbers of terminal devices may be included within the coverage of each network device, which is not limited by embodiments of the present disclosure. Optionally, the communication system may also include other network entities such as network controllers, mobility management entities and the like, which are not limited by embodiments of the present disclosure.

The network device may also include access network device and core network device. That is, the wireless communication system also includes a plurality of core networks for communicating with access network devices. The access network device may be an evolutionary node B (eNB or e-NodeB), macro base station, a micro base station (also referred to as a "small base station"), a pico base station, an access point (AP), a transmission point (TP) or a new generation Node B (gNodeB) in a long-term evolution (LTE) system, a next radio (mobile communication system) (NR) system or an authorized auxiliary access long-term evolution (LAA) system.

It should be understood that a device having a communication function in a network/system in the embodiments of the present disclosure may be referred to as a communication device. Taking the communication system illustrated in FIG. 1 as an example, the communication device may include a network device and a terminal device having a communication function, the network device and the terminal device may be specific devices described in the embodiments of the present disclosure and will not be elaborated here. The communication device may also include other devices in the communication system such as network controllers, mobility management entities and other network entities, which are not limited in embodiments of the present disclosure.

Figure 2:
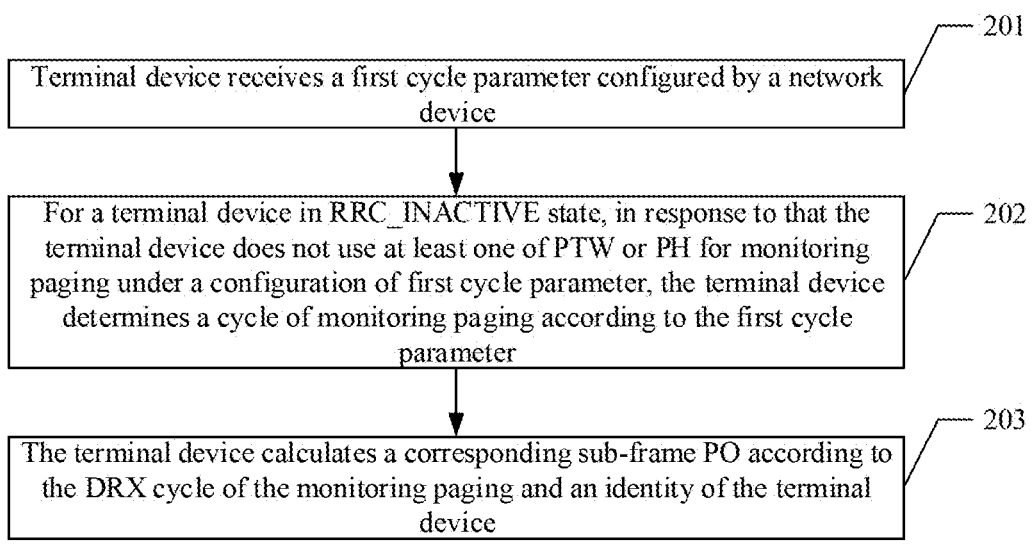
FIG. 2 is a schematic diagram of an embodiment of a method for determining a paging cycle in embodiments of the present disclosure.

The technical solution of the present disclosure will be further explained in the form of an embodiment below. As illustrated in FIG. 2, FIG. 2 is a schematic diagram of an embodiment of a method for determining a paging cycle in embodiments of the present disclosure, which may include the following operations.

At block 201, a terminal device receives a first cycle parameter configured by a network device.

The first cycle parameter includes at least one of a core network (CN) extended discontinuous reception (eDRX) cycle, a radio access network (RAN) eDRX cycle, a CN discontinuous reception (DRX) cycle, an RAN DRX cycle or a cell default paging cycle (defaultPagingCycle) indicated by a system message.

At block 202, for a terminal device in an RRC_INACTIVE state, in response to that the terminal device does not use at least one of a paging time window (PTW) or a paging hyperframe (PH) for monitoring paging under a configuration of a first cycle parameter, the terminal device determines a cycle of monitoring paging according to the first cycle parameter.

At block 203, the terminal device calculates its own corresponding sub-frame paging occasion (PO) according to the DRX cycle of the monitoring paging and an identity of the terminal device.

The operation that the terminal device determines the cycle of monitoring paging according to the first cycle parameter is described below by two implementations.

First Implementation:

In a case that the terminal device supports configuration of the CN eDRX cycle and does not support configuration of the RAN eDRX cycle, the terminal device determines that the cycle of monitoring paging is the shortest one of the CN eDRX cycle and an RAN paging cycle (ran-PagingCycle), or is the shortest one of the CN eDRX cycle, the ran-PagingCycle and the defaultPagingCycle.

It can be understood that only CN configuring a CN eDRX cycle through NAS signaling is supported, but RAN configuring an RAN eDRX cycle through RRC signaling is not supported (for example, a case that a maximum RAN paging cycle configurable by base station does not exceed 10.24 s). If the network configures the CN eDRX cycle to the UE and the configured CN eDRX cycle does not use PTW and/or PH, then for UE in an RRC_INACTIVE state, it is determined that the DRX cycle of monitoring paging for the UE is the shortest one of the CN eDRX cycle and a ran-PagingCycle, or is the shortest one of the CN eDRX cycle, the ran-PagingCycle and the defaultPagingCycle.

1. Optionally, the terminal device receives a first cycle parameter configured by a network device, the first cycle parameter being DRX related parameters and eDRX related parameters for determining the paging cycle, which may include the following operations.
   a) The terminal device receives DRX parameters configured by an NAS message from the CN, the DRX parameters including a UE-specific CN DRX cycle.
   b) The terminal device receives eDRX parameters configured by the NAS message from the CN, the eDRX parameters including CN eDRX cycle.
   c) The terminal device receives a cell defaultPagingCycle indicated by a system message.
   d) The terminal device receives an RRC release message from the RAN to indicate the UE to enter the RRC_INACTIVE state, and configures a UE-specific ran-PagingCycle at the same time.

2. Optionally, the operation that the terminal device determines the cycle of monitoring paging according to the first cycle parameter is described in the following situations.

First Situation

In a case that the defaultPagingCycle is not considered, the operation that the terminal device determines the cycle of monitoring paging according to the first cycle parameter may include the following.
   a) In response to that an RAN configures the ran-PagingCycle, the terminal device determines that the cycle of the monitoring paging is the shortest one of the CN eDRX cycle and the ran-PagingCycle;

Exemplarily, if the RAN configures a ran-PagingCycle for the UE, the cycle T of the monitoring paging is equal to min{CN eDRX cycle, ran-PagingCycle}.

b) In response to that the RAN does not configure the ran-PagingCycle, the terminal device determines that the cycle of the monitoring paging is the CN eDRX cycle.

Exemplarily, if the RAN does not configure the ran-PagingCycle for the UE, the cycle T of the monitoring paging is equal to CN eDRX cycle.

Second Situation

In a case that the defaultPagingCycle is considered, the operation that the terminal device determines the cycle of monitoring paging according to the first cycle parameter may include the following.

a) In response to that an RAN configures the ran-PagingCycle, the terminal device determines that the cycle of the monitoring paging is the shortest one of the CN eDRX cycle, the ran-PagingCycle and the defaultPagingCycle.

Exemplarily, if the RAN configures a ran-PagingCycle for the UE, the cycle T of the monitoring paging is equal to min{CN eDRX cycle, ran-PagingCycle, defaultPagingCycle}.

b) In response to that the RAN does not configure the ran-PagingCycle, the terminal device determines that the cycle of the monitoring paging is shortest one of the CN eDRX cycle and the defaultPagingCycle.

Exemplarily, if the RAN does not configure the ran-PagingCycle for the UE, the cycle T of the monitoring paging is equal to min{CN eDRX cycle, defaultPagingCycle}.

Figure 3A:
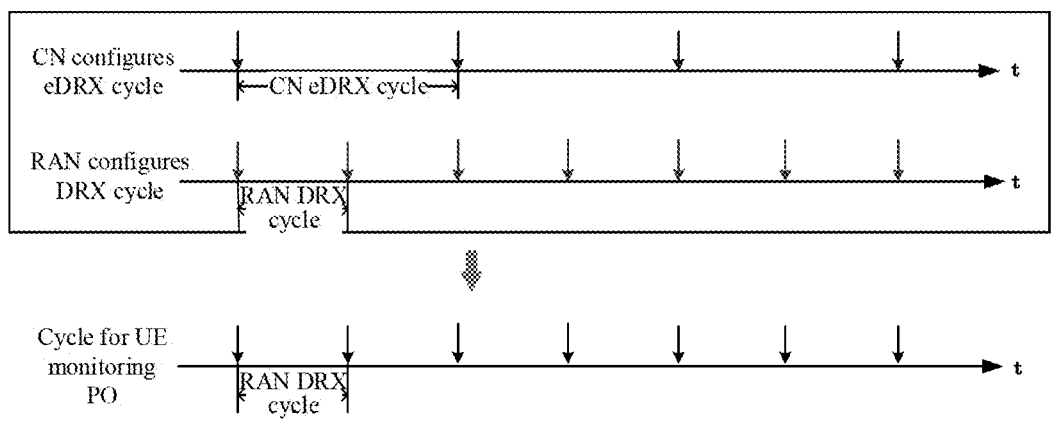
FIG. 3A is a schematic diagram of a terminal device determining a cycle of monitoring paging in embodiments of the present disclosure.

Exemplarily, with respect to the above-described first situation and second situation, as illustrated in FIG. 3A, FIG. 3A is a schematic diagram of a terminal device determining a cycle of monitoring paging in embodiments of the present disclosure.

3. Optionally, for UE in the RRC_INACTIVE state, the UE calculates its own corresponding PO according to the UE ID, paging cycle T, etc.

Second Implementation:

In a case that the terminal device supports configuration of CN eDRX cycle by a CN and configuration of RAN eDRX cycle by an RAN, the terminal device determines that the cycle of the monitoring paging is at least one of the CN eDRX cycle, the RAN eDRX cycle, the CN DRX cycle, the RAN DRX cycle, or the defaultPagingCycle.

It can be understood that configuration of CN eDRX through NAS signaling and configuration of RAN eDRX through RRC signaling are both supported (for example, a case that a maximum RAN paging cycle configurable by base station exceeds 10.24 s). If the network configures a CN eDRX cycle and/or an RAN eDRX cycle for the UE, and the configured CN eDRX cycle and the configured RAN eDRX cycle do not use PTW and/or PH (for example, for RedCap UE, the CN eDRX cycle configured by CN and RAN eDRX cycle configured by the base station are both 5.12 s), then for UE in the RRC_INACTIVE state, the DRX cycle of the monitoring paging for the UE is determined according to at least one of the configured CN eDRX cycle, RAN eDRX cycle, CN DRX cycle, RAN DRX cycle and cell defaultPagingCycle indicated by the system message.

1. Optionally, the terminal device receives a first cycle parameter configured by a network device, the first cycle parameter being DRX related parameters and eDRX related parameters for determining the paging cycle, which may include the following operations.

a) The terminal device receives DRX parameters configured by an NAS message from the CN, the DRX parameters including a UE-specific CN DRX cycle.

b) The terminal device receives eDRX parameters configured by the NAS message from the CN, the eDRX parameters including CN eDRX cycle.

c) The terminal device receives a cell defaultPagingCycle indicated by a system message.

d) The terminal device receives an RRC release message from the RAN to indicate the UE to enter the RRC_INACTIVE state, and configures a UE-specific ran-PagingCycle and a UE-specific RAN eDRX cycle at the same time.

2. Optionally, the operation that the terminal device determines the cycle of monitoring paging according to the first cycle parameter is described in the following situations.

First Situation

In response to that the CN configures the CN eDRX cycle and the RAN configures the RAN eDRX cycle, the terminal device determines that the cycle of the monitoring paging is the shortest one of the CN eDRX cycle and the RAN eDRX cycle.

Figure 3B:
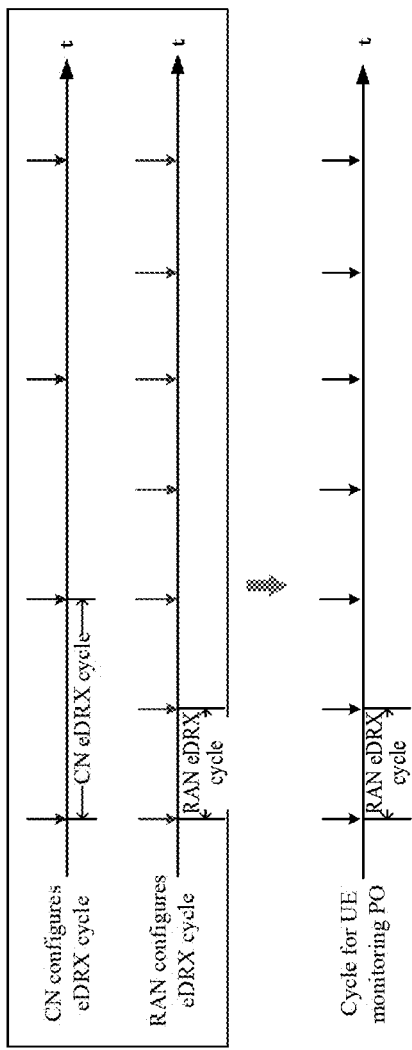
FIG. 3B is another schematic diagram of a terminal device determining a cycle of monitoring paging in embodiments of the present disclosure.

Exemplarily, if the CN configures the UE with a CN eDRX cycle through NAS signaling and the RAN configures the UE with an RAN eDRX cycle through RRC signaling, the cycle T of the monitoring paging is equal to min{CN eDRX cycle, RAN eDRX cycle}. With respect to the above-described first situation, as illustrated in FIG. 3B, FIG. 3B is another schematic diagram of a terminal device determining a cycle of monitoring paging in embodiments of the present disclosure.

Second Situation

In a case that the CN configures the CN eDRX cycle, the RAN does not configure the RAN eDRX cycle, and the defaultPagingCycle is not considered, the operation that the terminal device determines the cycle of monitoring paging according to the first cycle parameter may include the following.

a) In response to that an RAN configures the ran-PagingCycle, the terminal device determines that the cycle of the monitoring paging is the shortest one of the CN eDRX cycle and the ran-PagingCycle;

Exemplarily, if the RAN configures a ran-PagingCycle for the UE by an RRC signaling, the cycle T of the monitoring paging is equal to min{CN eDRX cycle, ran-PagingCycle}.

b) In response to that the RAN does not configure the ran-PagingCycle, the terminal device determines that the cycle of the monitoring paging is the CN eDRX cycle.

Exemplarily, if the RAN does not configure a ran-PagingCycle for the UE by an RRC signaling, the cycle T of the monitoring paging is equal to CN eDRX cycle.

Third Situation

In a case that the CN configures the CN eDRX cycle, the RAN does not configure the RAN eDRX cycle, and the defaultPagingCycle is considered, the operation that the terminal device determines the cycle of monitoring paging according to the first cycle parameter may include the following.

a) In response to that an RAN configures the ran-PagingCycle, the terminal device determines that the cycle of the monitoring paging is the shortest one of the CN eDRX cycle, the ran-PagingCycle and the defaultPagingCycle;

Exemplarily, if the RAN configures a ran-PagingCycle for the UE by an RRC signaling, the cycle T of the monitoring paging is equal to min{CN eDRX cycle, ran-PagingCycle, defaultPagingCycle}.

b) In response to that the RAN does not configure the ran-PagingCycle, the terminal device determines that the cycle of the monitoring paging is the shortest one of the CN eDRX cycle and the defaultPagingCycle.

Exemplarily, if the RAN does not configure a ran-PagingCycle for the UE by an RRC signaling, the cycle T of the monitoring paging is equal to min{CN eDRX cycle, defaultPagingCycle}.

Figure 3C:
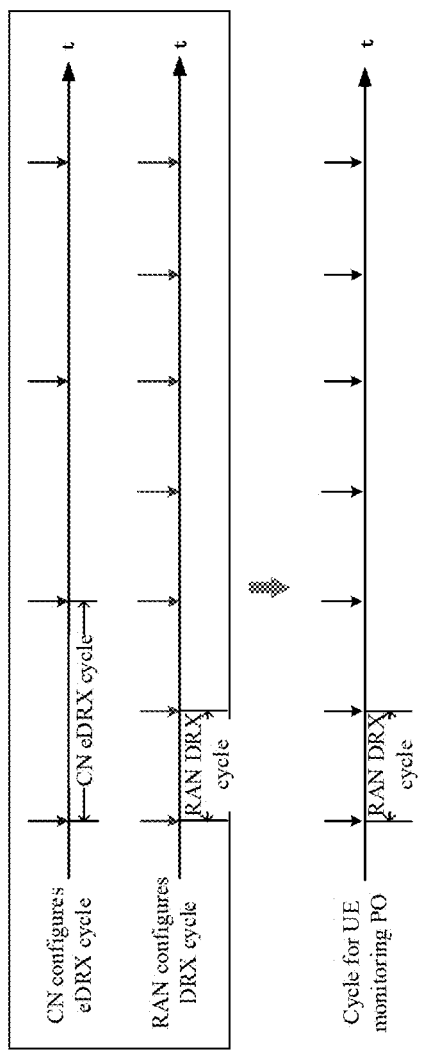
FIG. 3C is another schematic diagram of a terminal device determining a cycle of monitoring paging in embodiments of the present disclosure.

With respect to the above-described second situation and third situation, as illustrated in FIG. 3C, FIG. 3C is another schematic diagram of a terminal device determining a cycle of monitoring paging in embodiments of the present disclosure.

Fourth situation: In a case that the CN does not configure the CN eDRX cycle, the RAN configures the RAN eDRX cycle, and the defaultPagingCycle is considered, the operation that the terminal device determines the cycle of monitoring paging according to the first cycle parameter may include the following.

a) In response to that the CN configures the CN DRX cycle, the terminal device determines that the cycle of the monitoring paging is the shortest one of the CN DRX cycle, the defaultPagingCycle and the RAN eDRX cycle.

Exemplarily, if the CN configures a CN DRX cycle for the UE, the cycle T of the monitoring paging is equal to min{CN DRX cycle, defaultPagingCycle, RAN eDRX cycle}.

b) In response to that the CN does not configure the CN DRX cycle, the terminal device determines that the cycle of the monitoring paging is the shortest one of the defaultPagingCycle and the RAN eDRX cycle.

Figure 3D:
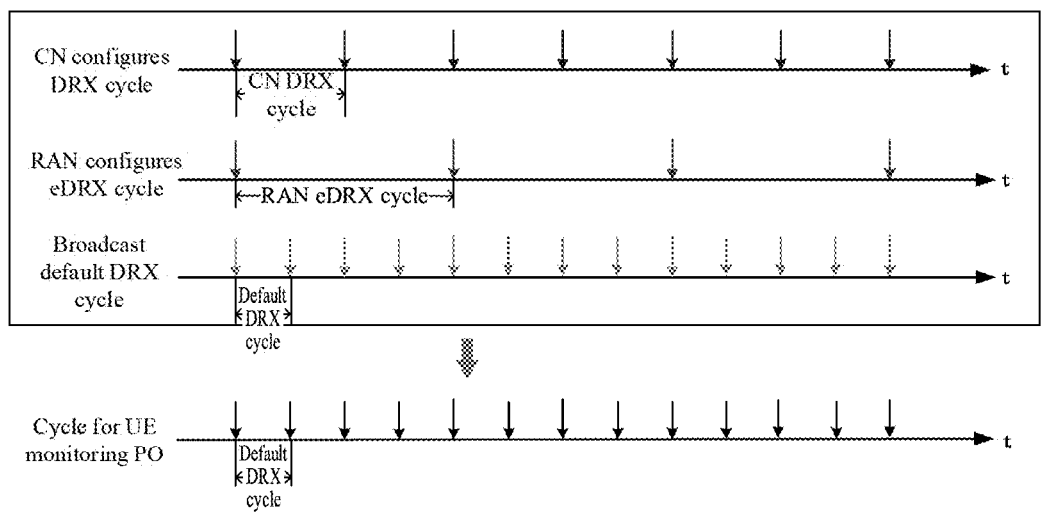
FIG. 3D is another schematic diagram of a terminal device determining a cycle of monitoring paging in embodiments of the present disclosure.

Exemplarily, if the CN does not configure a CN DRX cycle for the UE, the cycle T of the monitoring paging is equal to min{defaultPagingCycle, RAN eDRX cycle}. With respect to the above-described fourth situation, as illustrated in FIG. 3D, FIG. 3D is another schematic diagram of a terminal device determining a cycle of monitoring paging in embodiments of the present disclosure.

3. Optionally, for UE in the RRC_INACTIVE state, the UE calculates its own corresponding PO according to the UE_ID, paging cycle T, etc.

It should be noted that the cycle of monitoring paging may also be referred to as paging cycle for short.

In the embodiments of the present disclosure, a method for determining a paging cycle for UE in an RRC_INACTIVE state is disclosed. For a terminal device in an RRC_INACTIVE state, if the terminal device does not use at least one of a PTW or a PH for monitoring paging under a configuration of a first cycle parameter, the terminal device determines a cycle of monitoring paging according to the first cycle parameter. The first cycle parameter includes at least one of a CN eDRX cycle, an RAN eDRX cycle, a CN DRX cycle, an RAN DRX cycle or a cell defaultPagingCycle indicated by a system message. In this way, for UE which is in an RRC_INACTIVE state, is configured with an eDRX cycle, and does not use a PTW and/or a paging hyperframe (PH) under a configuration of the eDRX cycle, a behavior of UE monitoring paging is clear, such that the paging performance can be ensured, and the requirements of a terminal for energy saving can also be well taken into account.

Specifically, in a case that configuration of the CN eDRX cycle by the CN is supported only and configuration of the RAN eDRX cycle by the RAN is not supported, the UE in the RRC_INACTIVE state determines that the DRX cycle of monitoring paging for the UE is the shortest one of the CN eDRX cycle and the ran-PagingCycle, or is the shortest one of the CN eDRX cycle, the ran-PagingCycle and the defaultPagingCycle. In a case that configuration of the CN eDRX cycle by the CN and configuration of the RAN eDRX cycle by the RAN are both supported, the UE in the RRC_INACTIVE state determines the DRX cycle of monitoring paging for the UE according to at least one of the configured CN eDRX cycle, RAN eDRX cycle, CN DRX cycle, RAN DRX cycle and cell defaultPagingCycle indicated by the system message.

Figure 4:
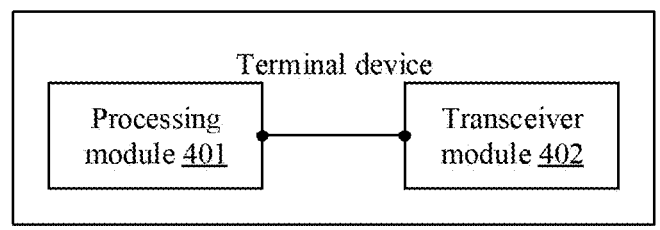
FIG. 4 is a schematic diagram of an embodiment of a terminal device in embodiments of the present disclosure.

FIG. 4 is a schematic diagram of an embodiment of a terminal device in embodiments of the present disclosure, and the terminal device includes a processing module 401.

The processing module 401 is configured to: for a terminal device in an RRC_INACTIVE state, in response to that the terminal device does not use at least one of a PTW or a PH for monitoring paging under a configuration of a first cycle parameter, determine a cycle of monitoring paging according to the first cycle parameter.

The first cycle parameter includes at least one of a CN eDRX cycle, an RAN eDRX cycle, a CN DRX cycle, an RAN DRX cycle or a cell defaultPagingCycle indicated by a system message.

Optionally, the processing module 401 is specifically configured to: in a case that the terminal device supports configuration of the CN eDRX cycle and does not support configuration of the RAN eDRX cycle, determine that the cycle of monitoring paging is the shortest one of the CN eDRX cycle and a ran-PagingCycle, or is the shortest one of the CN eDRX cycle, the ran-PagingCycle and the defaultPagingCycle.

Optionally, in a case that the defaultPagingCycle is not considered, the processing module 401 is specifically configured to:

in response to that an RAN configures the ran-PagingCycle, determine that the cycle of the monitoring paging is the shortest one of the CN eDRX cycle and the ran-PagingCycle;

in response to that the RAN does not configure the ran-PagingCycle, determine that the cycle of the monitoring paging is the CN eDRX cycle.

Optionally, in a case that the defaultPagingCycle is considered, the processing module 401 is specifically configured to:

in response to that an RAN configures the ran-PagingCycle, determine that the cycle of the monitoring paging is the shortest one of the CN eDRX cycle, the ran-PagingCycle and the defaultPagingCycle;

in response to that the RAN does not configure the ran-PagingCycle, determine that the cycle of the monitoring paging is shortest one of the CN eDRX cycle and the defaultPagingCycle.

Optionally, the processing module 401 is specifically configured to: in a case that the terminal device supports configuration of CN eDRX cycle by a CN and configuration of RAN eDRX cycle by an RAN, determine that the cycle of the monitoring paging is at least one of the CN eDRX cycle, the RAN eDRX cycle, the CN DRX cycle, the RAN DRX cycle, and the defaultPagingCycle.

Optionally, the processing module 401 is specifically configured to: in response to that the CN configures the CN eDRX cycle and the RAN configures the RAN eDRX cycle, determine that the cycle of the monitoring paging is the shortest one of the CN eDRX cycle and the RAN eDRX cycle.

Optionally, in a case that the CN configures the CN eDRX cycle, the RAN does not configure the RAN eDRX cycle, and the defaultPagingCycle is not considered, the processing module is specifically configured to:
  in response to that the RAN configures a ran-PagingCycle, determine that the cycle of the monitoring paging is the shortest one of the CN eDRX cycle and the ran-PagingCycle;
  in response to that the RAN does not configure the ran-PagingCycle, determine that the cycle of the monitoring paging is the CN eDRX cycle.

Optionally, in a case that the CN configures the CN eDRX cycle, the RAN does not configure the RAN eDRX cycle, and the defaultPagingCycle is considered, the processing module 401 is specifically configured to:
  in response to that the RAN configures a ran-PagingCycle, determine that the cycle of the monitoring paging is the shortest one of the CN eDRX cycle, the ran-PagingCycle and the defaultPagingCycle;
  in response to that the RAN does not configure the ran-PagingCycle, determine that the cycle of the monitoring paging is the shortest one of the CN eDRX cycle and the defaultPagingCycle.

Optionally, in a case that the CN does not configure the CN eDRX cycle, the RAN configures the RAN eDRX cycle, and the defaultPagingCycle is considered, the processing module 401 is specifically configured to:
  in response to that the CN configures the CN DRX cycle, determine that the cycle of the monitoring paging is the shortest one of the CN DRX cycle, the defaultPagingCycle and the RAN eDRX cycle;
  in response to that the CN does not configure the CN DRX cycle, determine that the cycle of the monitoring paging is the shortest one of the defaultPagingCycle and the RAN eDRX cycle.

Optionally, the terminal device further includes a transceiver module 402.

The transceiver module 402 is configured to receive the first cycle parameter configured by a network device.

Optionally, the processing module 401 is further configured to calculate a corresponding sub-frame paging occasion (PO) according to the DRX cycle of the monitoring paging and an identity of the terminal device.

Figure 5:
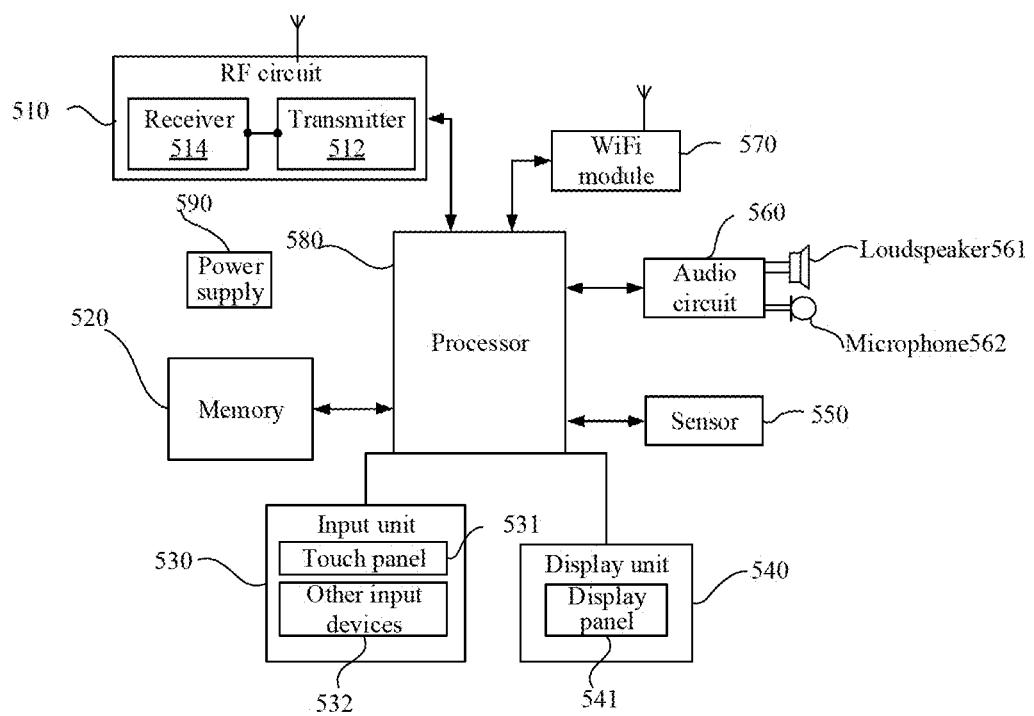
FIG. 5 is a schematic diagram of another embodiment of a terminal device in embodiments of the present disclosure.

Corresponding to the above-described method in at least one embodiment applied to the terminal device, the embodiments of the present disclosure also provide one or more terminal devices. The terminal device of the embodiments of the present disclosure may implement any one implementation of the above method. FIG. 5 is a schematic diagram of an embodiment of a terminal device in embodiments of the present disclosure. For example, the terminal device is a mobile phone, which may include a radio frequency (RF) circuit 510, a memory 520, an input unit 530, a display unit 540, a sensor 550, an audio circuit 560, and a wireless fidelity (WiFi) module 570, a processor 580, and a power supply 550. The RF circuit 510 includes a receiver 514 and a transmitter 512. Those skilled in the art will appreciate that the structure of the mobile phone illustrated in FIG. 5 does not constitute a limitation on the mobile phone and may include more or fewer parts than illustrated, or a combination of parts, or a different arrangement of parts.

The following is a detailed introduction to each component of the mobile phone with reference to FIG. 5.

The RF circuit 510 can be used for receiving and transmitting signals during sending and receiving information or talking. Specifically, the RF circuit 510 receives downlink information of the base station and then transmits it to the processor 580 to process. In addition, the RF circuit 510 transmits the designed uplink data to the base station. Generally, the RF circuit 510 includes but is not limited to antennas, at least one amplifier, transceivers, couplers, low noise amplifiers (LNA), duplexer, etc. In addition, the RF circuit 510 may also communicate with a network and other devices through wireless communication. The wireless communication may use any communication standard or protocol, including but not limited to the global system of mobile communication (GSM), general packet radio service (GPRS), code division multiple access (CDMA), wideband code division multiple access (WCDMA), long term evolution (LTE), E-mail, short messaging service (SMS), etc.

The memory 520 may be used to store software programs and modules, and the processor 580 implements various functional applications and data processing of the mobile phone by running the software programs and modules stored in the memory 520. The memory 520 may mainly include a program storage area and a data storage area. The program storage area may store an operating system, an application program required for at least one function (such as a sound playback function, an image playback function or the like) and the like. The data storage area may store data (such as audio data, phone book, etc.) created according to the use of the mobile phone. Additionally, the memory 520 may include high-speed random access memory and may also include non-volatile memory, such as at least one disk storage device, flash memory device or other volatile solid-state storage device.

The input unit 530 may be used to receive inputted numeric or character information and to generate key signal input related to user settings and function control of the mobile phone. Specifically, the input unit 530 may include a touch panel 531 and other input devices 532. The touch panel 531, also referred to as a touch screen, may collect touch operations on or near the touch panel 531 by a user (such as operations on or near the touch panel 531 by a user using any suitable object or accessory such as a finger, stylus, etc.) and drive corresponding connection devices according to a preset program. Optionally, the touch panel 531 may include two parts of a touch detection device and a touch controller. The touch detection device detects the touch orientation of the user, detects the signal brought by the touch operation, and transmits the signal to the touch controller. The touch controller receives touch information from the touch detection device, converts it into contact coordinates, sends it to the processor 580, and can receive and execute commands from the processor 580. In addition, the touch panel 531 may be implemented in various types such as resistive, capacitive, infrared and surface acoustic waves. The input unit 530 may include other input devices 532 in addition to the touch panel 531. Specifically, other input devices 532 may include but are not limited to one or more of a physical keyboard, function keys (such as volume control keys, switch keys etc.), trackball, mouse, joystick, etc.

The display unit 540 may be used to display information input by or provided to the user and various menus of the mobile phone. The display unit 540 may include a display panel 541, which may optionally be configured in the form of a liquid crystal display (LCD), an organic light-emitting diode (OLED) or the like. Further, the touch panel 531 may overlay the display panel 541, and when the touch panel 531 detects a touch operation on or near it, the touch operation is transmitted to the processor 580 to determine a type of touch event, and then the processor 580 provides a corresponding visual output on the display panel 541 according to the type of touch event. Although in FIG. 5, the touch panel 531 and the display panel 541 are two independent components to implement the input and output functions of the mobile phone, but in some embodiments, the touch panel 531 and the display panel 541 may be integrated to implement the input and output functions of the mobile phone.

The mobile phone may also include at least one sensor 550, such as a light sensor, a motion sensor and other sensors. Specifically, the light sensor may include an ambient light sensor that can adjust the brightness of the display panel 541 according to the brightness of the ambient light and a proximity sensor that can turn off the display panel 541 and/or the backlight when the mobile phone moves to the ear. As a kind of motion sensor, the accelerometer sensor can detect the acceleration in all directions (usually three axes), and can detect the magnitude and direction of gravity when it is still. It can be used to the application of identifying mobile phone attitude (such as horizontal and vertical screen switching, related games, magnetometer attitude calibration), vibration recognition related functions (such as pedometer, knocking), etc. As for gyroscopes, barometers, hygrometers, thermometers, infrared sensors and other sensors that can be configured in mobile phones, they will not be repeated here.

The audio circuit 560, the loudspeaker 561 and the microphone 562 may provide audio interfaces between the user and the mobile phone. The audio circuit 560 may transmit the received electrical signal converted by audio data to the loudspeaker 561, and the loudspeaker 561 converts it into a sound signal for output. On the other hand, the microphone 562 converts the collected sound signal into an electrical signal, the audio circuit 560 receives the electrical signal and converts it into audio data, and then outputs the audio data to the processor 580 for processing, and the processor 580 transmits the audio data to, for example, another mobile phone via the RF circuit 510, or outputs the audio data to the memory 520 for further processing.

WiFi is a short-distance wireless transmission technology. Mobile phones can help users send and receive e-mails, browse web pages and access streaming media through WiFi module 570, which provides users with wireless broadband internet access. Although the WiFi module 570 is illustrated in FIG. 5, it is understood that the WiFi module 570 is not an essential component of a mobile phone and may be omitted as necessary without changing the essence of the invention.

The processor 580 is a control center of the mobile phone, the processor connects various parts of the whole mobile phone by various interfaces and lines, executes various functions of the mobile phone and processes data by running or executing software programs and/or modules stored in the memory 520, and calls data stored in the memory 520, thereby monitoring the mobile phone as a whole. Optionally, the processor 580 may include one or more processing units. Preferably, the processor 580 may integrate an application processor and a modem processor. The application processor primarily handles operating systems, user interfaces, applications, and the like. The modem processor primarily handles wireless communications. It will be appreciated that the modem processor described above may also not be integrated into the processor 580.

The mobile phone also includes a power supply 590 (such as a battery) for supplying power to the various components, and preferably, the power supply may be logically connected to the processor 580 through a power management system, thereby realizing functions such as managing charging, discharging, and power consumption management through the power management system. Although not illustrated, the mobile phone may also include a camera, a Bluetooth module, etc., which will not be repeated here.

In the embodiments of the present disclosure, the processor 580 is configured to: for a terminal device in an RRC_INACTIVE state, in response to that the terminal device does not use at least one of a PTW or a PH for monitoring paging under a configuration of a first cycle parameter, determine a cycle of monitoring paging according to the first cycle parameter.

The first cycle parameter includes at least one of a CN eDRX cycle, an RAN eDRX cycle, a CN DRX cycle, an RAN DRX cycle or a cell defaultPagingCycle indicated by a system message.

Optionally, the processor 580 is specifically configured to: in a case that the terminal device supports configuration of the CN eDRX cycle and does not support configuration of the RAN eDRX cycle, determine that the cycle of monitoring paging is the shortest one of the CN eDRX cycle and a ran-PagingCycle, or is the shortest one of the CN eDRX cycle, the ran-PagingCycle and the defaultPagingCycle.

Optionally, in a case that the defaultPagingCycle is not considered, the processor 580 is specifically configured to:
in response to that an RAN configures the ran-PagingCycle, determine that the cycle of the monitoring paging is the shortest one of the CN eDRX cycle and the ran-PagingCycle;
in response to that the RAN does not configure the ran-PagingCycle, determine that the cycle of the monitoring paging is the CN eDRX cycle.

Optionally, in a case that the defaultPagingCycle is considered, the processor 580 is specifically configured to:
in response to that the RAN configures a ran-PagingCycle, determine that the cycle of the monitoring paging is the shortest one of the CN eDRX cycle, the ran-PagingCycle and the defaultPagingCycle;
in response to that the RAN does not configure the ran-PagingCycle, determine that the cycle of the monitoring paging is the shortest one of the CN eDRX cycle and the defaultPagingCycle.

Optionally, the processor 580 is specifically configured to: in a case that the terminal device supports configuration of CN eDRX cycle by a CN and configuration of RAN eDRX cycle by an RAN, determine that the cycle of the monitoring paging is at least one of the CN eDRX cycle, the RAN eDRX cycle, the CN DRX cycle, the RAN DRX cycle, and the defaultPagingCycle.

Optionally, the processor 580 is specifically configured to: in a case that the CN configures the CN eDRX cycle and the RAN configures the RAN eDRX cycle, determine that the cycle of the monitoring paging is the shortest one of the CN eDRX cycle and the RAN eDRX cycle.

Optionally, in a case that the CN configures the CN eDRX cycle, the RAN does not configure the RAN eDRX cycle, and the defaultPagingCycle is not considered, the processor 580 is specifically configured to:
in response to that an RAN configures the ran-PagingCycle, determine that the cycle of the monitoring paging is the shortest one of the CN eDRX cycle and the ran-PagingCycle;

in response to that the RAN does not configure the ran-PagingCycle, determine that the cycle of the monitoring paging is the CN eDRX cycle.

Optionally, in a case that the CN configures the CN eDRX cycle, the RAN does not configure the RAN eDRX cycle, and the defaultPagingCycle is considered, the processor 580 is specifically configured to:

in response to that the RAN configures a ran-PagingCycle, determine that the cycle of the monitoring paging is the shortest one of the CN eDRX cycle, the ran-PagingCycle and the defaultPagingCycle;

in response to that the RAN does not configure the ran-PagingCycle, determine that the cycle of the monitoring paging is the shortest one of the CN eDRX cycle and the defaultPagingCycle.

Optionally, in a case that the CN does not configure the CN eDRX cycle, the RAN configures the RAN eDRX cycle, and the defaultPagingCycle is considered, the processor 580 is specifically configured to:

in response to that the CN configures the CN DRX cycle, determine that the cycle of the monitoring paging is the shortest one of the CN DRX cycle, the defaultPagingCycle and the RAN eDRX cycle;

in response to that the CN does not configure the CN DRX cycle, determine that the cycle of the monitoring paging is the shortest one of the defaultPagingCycle and the RAN eDRX cycle.

Optionally, the RF circuit 510 is configured to receive the first cycle parameter configured by a network device.

Optionally, the processor 580 is further configured to calculate a corresponding sub-frame paging occasion (PO) according to the DRX cycle of the monitoring paging and an identity of the terminal device.

In the above-described embodiments, it may be implemented in whole or in part by software, hardware, firmware or any combination thereof. When implemented in software, it can be implemented in whole or in part in the form of a computer program product. The computer program product includes one or more computer instructions.

When the computer program instructions are loaded and executed on a computer, the flow or function described in accordance with embodiments of the present disclosure is generated in whole or in part. The computer may be a general purpose computer, a special purpose computer, a computer network, or other programmable device. The computer instructions may be stored in a computer-readable storage medium, or be transmitted from one computer-readable storage medium to another. For example, the computer instructions may be transmitted from a web site, computer, server, or data center to another web site, computer, server, or data center via wired (e.g. coaxial cable, optical fiber, digital subscriber line (DSL)) or wireless (e.g. infrared, wireless, microwave, etc.). The computer-readable storage medium may be any usable medium accessible to a computer or a data storage device containing one or more usable media integration, such as a server, data center, etc. The usable media may be magnetic media (e.g. floppy disk, hard disk, magnetic tape), optical media (e.g. DVD), or semiconductor media (e.g. solid state disk (SSD)), etc.

The terms "first", "second", "third", "fourth", etc. (if present) in the description and claims of the present disclosure and the above drawings are used to distinguish similar objects and are not intended to describe a particular order or priority. It should be understood that the data thus used can be interchanged where appropriate so that the embodiments described herein can be implemented in an order other than that illustrated or described herein. In addition, the terms "including" and "having" and any variations of them are intended to cover non-exclusive inclusion, for example, a process, method, system, product, or device that includes a series of steps or units does not need to be limited to those clearly listed, but may include other steps or units that are not clearly listed or inherent to such processes, methods, products, or devices.

The invention claimed is:

1. A method for determining a paging cycle, comprising:
   for a terminal device in a radio resource control inactive (RRC_INACTIVE) state, in response to that the terminal device does not use at least one of a paging time window (PTW) or a paging hyperframe (PH) for monitoring paging under a configuration of a first cycle parameter, determining, by the terminal device, a cycle of monitoring paging according to the first cycle parameter based on a comparison of a first duration of the cycle of monitoring paging and a second duration indicated by the first cycle parameter;
   wherein the first cycle parameter comprises at least one of a core network (CN) extended discontinuous reception (eDRX) cycle, a radio access network (RAN) eDRX cycle, a CN discontinuous reception (DRX) cycle, an RAN DRX cycle or a cell default paging cycle (defaultPagingCycle) indicated by a system message.

2. The method of claim 1, wherein determining, by the terminal device, the cycle of monitoring paging according to the first cycle parameter comprises:
   in a case that the terminal device supports configuration of the CN eDRX cycle and does not support configuration of the RAN eDRX cycle, determining, by the terminal device, that the cycle of monitoring paging is the shortest one of the CN eDRX cycle and an RAN paging cycle (ran-PagingCycle), or is the shortest one of the CN eDRX cycle, the ran-PagingCycle and the defaultPagingCycle.

3. The method of claim 2, wherein in a case that the defaultPagingCycle is not considered, determining, by the terminal device, the cycle of monitoring paging according to the first cycle parameter comprises:
   in response to that an RAN configures the ran-PagingCycle, determining, by the terminal device, that the cycle of the monitoring paging is the shortest one of the CN eDRX cycle and the ran-PagingCycle;
   in response to that the RAN does not configure the ran-PagingCycle, determining, by the terminal device, that the cycle of the monitoring paging is the CN eDRX cycle.

4. The method of claim 1, wherein determining, by the terminal device, the cycle of monitoring paging according to the first cycle parameter, comprises:
   in a case that the terminal device supports configuration of CN eDRX cycle by a CN and configuration of RAN eDRX cycle by an RAN, determining, by the terminal device, that the cycle of the monitoring paging is at least one of the CN eDRX cycle, the RAN eDRX cycle, the CN DRX cycle, the RAN DRX cycle, and the defaultPagingCycle.

5. The method of claim 4, wherein determining, by the terminal device, the cycle of monitoring paging according to the first cycle parameter, comprises
   in response to that the CN configures the CN eDRX cycle and the RAN configures the RAN eDRX cycle, determining, by the terminal device, that the cycle of the monitoring paging is the shortest one of the CN eDRX cycle and the RAN eDRX cycle.

6. The method of claim 4, wherein in a case that the CN configures the CN eDRX cycle, the RAN does not configure the RAN eDRX cycle, and the defaultPagingCycle is not considered, determining, by the terminal device, the cycle of monitoring paging according to the first cycle parameter comprises:
   in response to that the RAN configures an ran-PagingCycle, determining, by the terminal device, that the cycle of the monitoring paging is the shortest one of the CN eDRX cycle and the ran-PagingCycle;
   in response to that the RAN does not configure the ran-PagingCycle, determining, by the terminal device, that the cycle of the monitoring paging is the CN eDRX cycle.

7. The method of claim 1, further comprising:
receiving, by the terminal device, the first cycle parameter configured by a network device.

8. The method of claim 1, further comprising:
calculating, by the terminal device, a corresponding sub-frame paging occasion (PO) according to the DRX cycle of the monitoring paging and an identity of the terminal device.

9. A terminal device, comprising:
a processor, configured to: for a terminal device in a radio resource control inactive (RRC_INACTIVE) state, in response to that the terminal device does not use at least one of a paging time window (PTW) or a paging hyperframe (PH) for monitoring paging under a configuration of a first cycle parameter, determine a cycle of monitoring paging according to the first cycle parameter based on a comparison of a first duration of the cycle of monitoring paging and a second duration indicated by the first cycle parameter;
wherein the first cycle parameter comprises at least one of a core network (CN) extended discontinuous reception (eDRX) cycle, a radio access network (RAN) eDRX cycle, a CN discontinuous reception (DRX) cycle, an RAN DRX cycle or a cell default paging cycle (defaultPagingCycle) indicated by a system message.

10. The terminal device of claim 9, wherein
the processor is specifically configured to: in response to that the terminal device supports configuration of the CN eDRX cycle and does not support configuration of the RAN eDRX cycle, determine that the cycle of monitoring paging is a smaller one in the CN eDRX cycle and an RAN paging cycle (ran-PagingCycle), or is the shortest one of the CN eDRX cycle, the ran-PagingCycle and the defaultPagingCycle.

11. The terminal device of claim 10, wherein in a case that the defaultPagingCycle is not considered, the processor is configured to:
   in response to that an RAN configures the ran-PagingCycle, determine that the cycle of the monitoring paging is the shortest one of the CN eDRX cycle and the ran-PagingCycle;
   in response to that the RAN does not configure the ran-PagingCycle, determine that the cycle of the monitoring paging is the CN eDRX cycle.

12. The terminal device of claim 9, wherein
the processor is specifically configured to: in response to that the terminal device supports configuration of CN eDRX cycle by a CN and configuration of RAN eDRX cycle by an RAN, determine that the cycle of the monitoring paging is at least one of the CN eDRX cycle, the RAN eDRX cycle, the CN DRX cycle, the RAN DRX cycle, and the defaultPagingCycle.

13. The terminal device of claim 12, wherein
the processor is specifically configured to: in response to that the CN configures the CN eDRX cycle and the RAN configures the RAN eDRX cycle, determine that the cycle of the monitoring paging is the shortest one of the CN eDRX cycle and the RAN eDRX cycle.

14. The terminal device of claim 12, wherein in a case that the CN configures the CN eDRX cycle, the RAN does not configure the RAN eDRX cycle, and the defaultPagingCycle is not considered, the processor is specifically configured to:
   in response to that the RAN configures a ran-PagingCycle, determine that the cycle of the monitoring paging is the shortest one of the CN eDRX cycle and the ran-PagingCycle;
   in response to that the RAN does not configure the ran-PagingCycle, determine that the cycle of the monitoring paging is the CN eDRX cycle.

15. The terminal device of claim 9, further comprising:
a transceiver, configured to receive the first cycle parameter configured by a network device.

16. The terminal device of claim 9, wherein
the processor is further configured to calculate a corresponding sub-frame paging occasion (PO) according to the DRX cycle of the monitoring paging and an identity of the terminal device.

17. A network device, comprising:
a processor, configured to configure a first cycle parameter to a terminal device in a radio resource control inactive (RRC_INACTIVE) state based on a comparison of a first duration of a cycle of monitoring paging and a second duration indicated by the first cycle parameter,
wherein the first cycle parameter comprises at least one of a core network (CN) extended discontinuous reception (eDRX) cycle, a radio access network (RAN) eDRX cycle, a CN discontinuous reception (DRX) cycle, an RAN DRX cycle or a cell default paging cycle (defaultPagingCycle) indicated by a system message.

* * * * *